United States Patent Office 3,094,350
Patented June 18, 1963

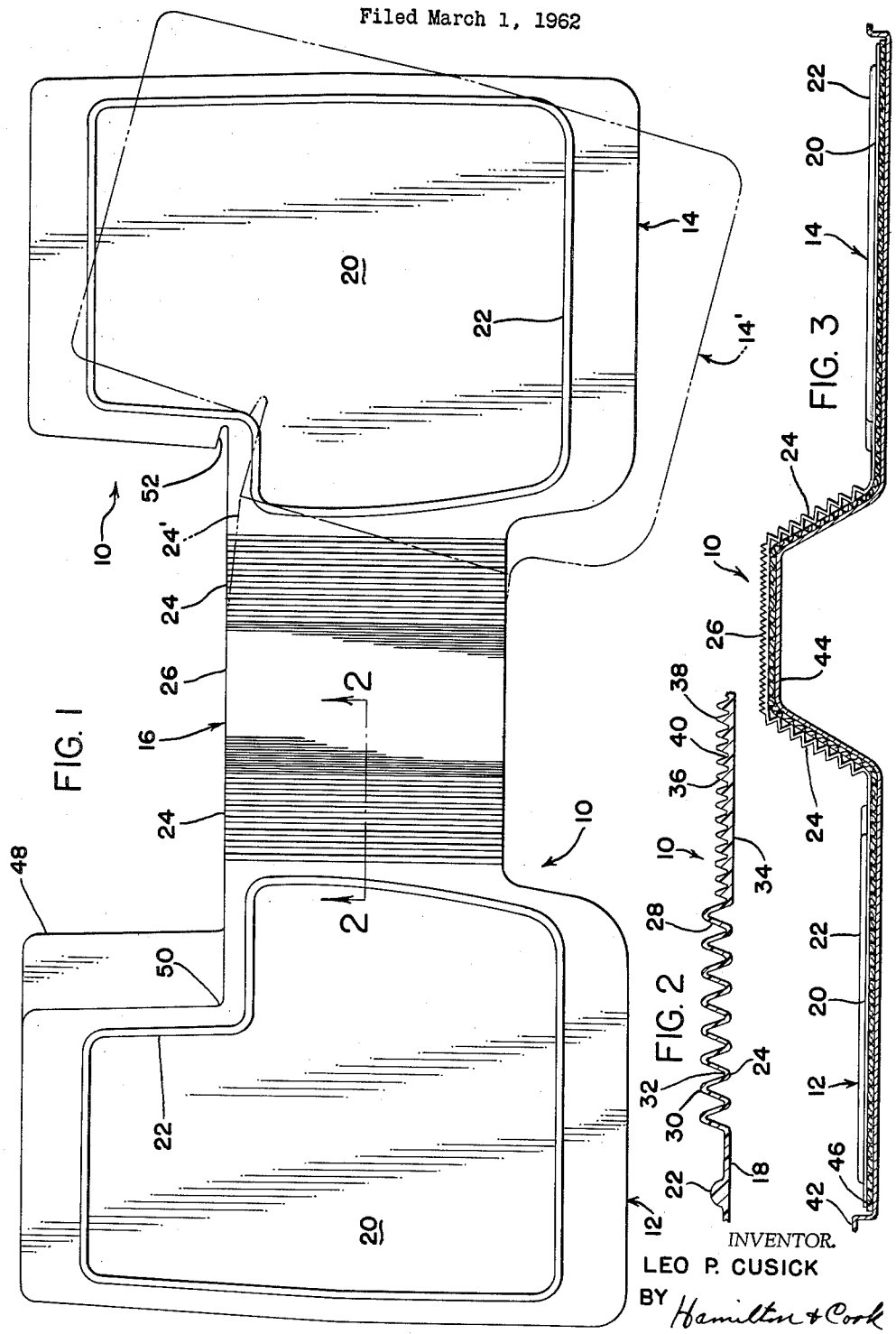

3,094,350
ADJUSTABLE CAR MAT
Leo P. Cusick, Wooster, Ohio, assignor to Rubbermaid Incorporated, Wooster, Ohio, a corporation of Ohio
Filed Mar. 1, 1962, Ser. No. 176,573
2 Claims. (Cl. 296—1)

The present invention relates to floor mats and in particular to floor mats for the front floors of cars.

The front floors of automobiles or cars are of varying dimensions, the configuration thereof varying considerably among the different makes of cars. In most modern automobiles the engine is located in the front of the car, and there is a transmission hump in the center of the width of the front floor which will also vary considerably in height and width for different makes of cars.

Accordingly, one of the objects of the present invention is to provide a floor mat which is adjustable to give a custom fit to various contoured and dimensioned floors in the different makes of cars.

The aforementioned object, and other objects are attained by the adjustable car floor mat, a preferred embodiment of which is shown in the accompanying drawings and described herein.

In the drawings:

FIG. 1 is a plan view of the adjustable floor mat;

FIG. 2 is a partial cross section of the adjustable floor mat taken along line 2—2 of FIG. 1; and FIG. 3 is a longitudinal elevation of the floor mat on the front floor of a car having a transmission hump with the floor and floor carpet being in cross section.

The adjustable floor mat 10 serves as a protective covering for the floor carpet of a car, taking the brunt of wear from persons getting in and out of the car, and from shifting of feet from one floor control to another. The mat may be fabricated from rubber, vinyl or any other suitable flexible material. Broadly, the basic components of the mat are a floor panel section 12 for the driver's side and a floor panel section 14 for the passenger's side, both floor panel sections being joined by an adjustable panel section 16.

The lower surface 18 of each of the floor panel sections is preferably flat while the upper surface 20 may be ribbed, or checked or carry any type of design which will enhance the wearing abilities of the mat. Each floor panel section is also outlined with an embossed rib 22 which serves not only a decorative function but also as added reinforcements to the panel sections.

The adjustable panel section 16 has accordion panels 24 of predetermined width one directly adjoining each of the floor panel sections and a centrally disposed preferably ribbed panel 26 joining the two accordion panels 24.

Each accordion panel 24 is corrugated or pleated on each of its top and bottom surfaces and is capable of readily expanding and contacting to a predetermined extent. The corrugations or pleats consist of inclined surfaces 28, and parallel alternate ridges 30 and grooves 32 transverse to the longitudinal alignment of the three panel sections.

The ribbed central panel 26 is flexible but non-expansible and is preferably corrugated only on its top surface while its bottom surface 34 is preferably flat. The corrugations consist of inclined surfaces 36, and parallel alternate ridges or solid V-shaped ribs 38 and grooves 40 transverse to the longitudinal alignment of the three panel sections. It will be observed from FIG. 2 that the extent of the height of the ridges or V-shaped ribs 38 is less than the height of the accordion panel top surface ridges 30, although the valley of the grooves 40 is on the same level with that of the accordion panel top surface grooves 32.

The ribbed central panel 26 serves as a relatively fixed area when in position on a car floor about which the floor panel sections 12 and 14 are hinged to swing via the two accordion panels 24. The center of the ribbed panel may contain a custom insignia or other indicia (not shown) if considered desirable.

As illustrated in FIG. 1 in phantom lines, the panel section 14' may swing out of alignment with respect to the ribbed central panel 26 and driver's panel section 12. Although not specifically illustrated, the corresponding corrugations of accordion panel 24' would expand or fan out near its upper edges while the corrugations near its lower edges would contract in order for the panel 24' to assume the position as illustrated.

Illustrated in FIG. 3 is one type of car floor 42 with a transmission hump 44 and carpeting 46, overlying which is the adjustable floor mat 10. Obviously, since all car floors are not of the same dimensions or configurations, as previously mentioned, the accordion panels 24 and ribbed central panel 26 may not always conform with the transmission hump so that each panel will be in a single and separate plane as shown, and accurate conformation is not necessary.

Depending on the width of the driver's side of the front floor, a severable additional panel portion 48 may be formed integral with the driver's floor panel section 12 and delineated by a shallow, narrow groove 50. The groove will permit the portion to be readily and neatly removed if the particular make of car has a floor configuration which would interfere with the additional portion.

A notch 52 is preferably provided in the floor panel section 14 for the passenger's side so as to bend upwardly without buckling if the floor configuration should require. Generally speaking, the driver's floor area may often be larger, especially in width, than that of the passenger's side. Therefore, the spacing between the floor panel sections may be proportionally greater.

It will be seen that a versatile type car mat is provided by the present invention.

What is claimed is:

1. A mat for the front floors of cars having central humps of various dimensions, comprising
   a non-expansible central panel for resting on top of said humps,
   floor panel sections on both sides of said central panel having outer configurations for substantially conforming to the outer configuration of the car floor,
   and laterally expansible accordion-like sections connecting said floor panel sections to said central panel,
   each said accordion-like section having a plurality of corrugations for conforming to various hump dimensions while maintaining the outer configurations of said side panels in place.

2. A flexible mat for the front floors of cars having central humps of various dimensions, comprising
   a central section for resting on top of said humps,
   floor panel sections on both sides of said central panel having outer peripheries adapted to substantially conform to the outer margin of the car floor,
   and laterally expansible accordion-like sections connecting said floor panel sections to said central panel,
   each said accordion-like section having a plurality of corrugations for conforming to various hump dimensions while maintaining the outer configurations of said side panels in place.

References Cited in the file of this patent
UNITED STATES PATENTS

| | | |
|---|---|---|
| 239,159 | Gaussen | Mar. 22, 1881 |
| 1,805,038 | Derr | May 12, 1931 |
| 1,994,145 | Moule | Mar. 12, 1935 |
| 2,740,739 | Harwin et al. | Apr. 3, 1956 |